US010339120B2

(12) United States Patent
Davidson et al.

(10) Patent No.: US 10,339,120 B2
(45) Date of Patent: Jul. 2, 2019

(54) METHOD AND SYSTEM FOR RECORDING INFORMATION ABOUT RENDERED ASSETS (71) Applicants: Sony Corporation, Tokyo (JP); Sony Pictures Technologies Inc., Culver City, CA (US)

(72) Inventors: Alan L. Davidson, Sherman Oaks, CA (US); Steve LaVietes, Santa Monica, CA (US); Blair J. Zajac, Jr., Hemet, CA (US); Robert B. Engle, Encino, CA (US)

(73) Assignees: SONY CORPORATION, Tokyo (JP); SONY PICTURES TECHNOLOGIES INC., Culver City, CA (US)

( * ) Notice: Subject to any disclaimer, the term of this patent is extended or adjusted under 35 U.S.C. 154(b) by 398 days.

(21) Appl. No.: 13/842,552

(22) Filed: Mar. 15, 2013

(65) Prior Publication Data
US 2014/0279976 A1    Sep. 18, 2014

(51) Int. Cl.
G06F 17/30    (2006.01)
G06F 16/21    (2019.01)
G06F 16/56    (2019.01)

(52) U.S. Cl.
CPC ............ *G06F 16/219* (2019.01); *G06F 16/56* (2019.01)

(58) Field of Classification Search
CPC ......... G06F 17/30309; G06F 17/30038; G06F 17/30271; G11B 27/034
USPC ........................................ 707/695, 802, 825
See application file for complete search history.

(56) References Cited

U.S. PATENT DOCUMENTS

| 5,603,018 | A  | * | 2/1997  | Terada et al. ................. 712/220 |
| 6,686,926 | B1 |   | 2/2004  | Kaye |
| 6,947,958 | B2 | * | 9/2005  | Davidson et al. |
| 7,683,904 | B2 | * | 3/2010  | Bugaj ..................... G06T 13/00 345/473 |
| 7,821,516 | B2 | * | 10/2010 | Bugaj ..................... G06T 15/00 345/473 |
| 8,024,356 | B2 | * | 9/2011  | Vienneau .......... G06F 17/30362 345/522 |
| 8,219,637 | B2 | * | 7/2012  | Harrison ........... G06F 17/30194 345/547 |
| 8,624,898 | B1 | * | 1/2014  | Bugaj ..................... G06T 13/00 345/418 |
| 9,196,074 | B1 | * | 11/2015 | Bhat ....................... G06T 17/20 |
| 9,214,191 | B2 | * | 12/2015 | Guzik ................. G11B 27/034 |

(Continued)

*Primary Examiner* — Jean M Corrielus
(74) *Attorney, Agent, or Firm* — Mayer & Williams PC (57) ABSTRACT

Systems and methods presented here allow recreation of prior scenes, even if assets used in the scenes have evolved over time. The systems and methods employ query of a database to obtain data for backup and retrieval, e.g., information about shots made at prior points in time, where a "shot" refers to a scene or associated set of sequential frames (a single image may also be considered a shot in some instances), rendered or not depending on context. In the VP-VCR systems and methods, information may be obtained about rendered scenes which allow knowledge and subsequent use of each asset employed in the scene, including its proper version and representation at the time of the rendering. Such may be employed not only to obtain prior versions of shots, but also to allow modification of assets in prior shots to obtain new effects.

19 Claims, 9 Drawing Sheets (56) References Cited

U.S. PATENT DOCUMENTS

| | | | |
|---|---|---|---|
| 9,477,667 B2* | 10/2016 | Karim | G06F 17/3002 |
| 2005/0163462 A1* | 7/2005 | Pratt | G11B 27/11 |
| | | | 386/233 |
| 2005/0228829 A1* | 10/2005 | Richards | G11B 27/36 |
| 2005/0253839 A1* | 11/2005 | Bugaj | G06T 15/00 |
| | | | 345/418 |
| 2005/0253848 A1* | 11/2005 | Bugaj | G06T 13/00 |
| | | | 345/473 |
| 2006/0010153 A1* | 1/2006 | Bugaj | G06T 13/00 |
| 2006/0015431 A1* | 1/2006 | Bugaj | G06Q 40/00 |
| | | | 705/35 |
| 2006/0117344 A1* | 6/2006 | Lamkin | G06F 17/30017 |
| | | | 725/38 |
| 2007/0185881 A1* | 8/2007 | Vienneau | G06F 17/30362 |
| 2009/0144402 A1* | 6/2009 | Harrison | G06T 13/00 |
| | | | 709/221 |
| 2010/0156894 A1 | 6/2010 | Holler et al. | |
| 2010/0274816 A1* | 10/2010 | Guzik | G11B 27/034 |
| | | | 707/802 |
| 2010/0281383 A1 | 11/2010 | Meaney | |
| 2011/0018998 A1* | 1/2011 | Guzik | H04N 21/21 |
| | | | 348/143 |
| 2011/0173214 A1* | 7/2011 | Karim | G06F 17/3002 |
| | | | 707/754 |
| 2012/0001907 A1 | 1/2012 | Wilkinson | |
| 2012/0120054 A1 | 5/2012 | Sandrew | |
| 2013/0027552 A1* | 1/2013 | Guzik | G11B 27/034 |
| | | | 348/143 |
| 2013/0232398 A1* | 9/2013 | Morehead | G06Q 10/10 |
| | | | 715/202 |
| 2017/0017653 A1* | 1/2017 | Karim | G06F 17/3002 |

* cited by examiner

METHOD AND SYSTEM FOR RECORDING INFORMATION ABOUT RENDERED ASSETS

CROSS-REFERENCE TO RELATED APPLICATIONS (None.)

BACKGROUND

Motion picture production is becoming increasingly complex, and such is even more true of motion pictures involving significant numbers of computer-generated objects and characters. Generally a number of CG assets are constructed by artists and modelers and the same are employed by the visual effects team for various scenes. Lighting is added, and the scene is composited and rendered to create a final shot, i.e., sequential set of frames representing a scene.

In smaller productions assets to be rendered may all be known in advance, and rendering may proceed in an essentially custom fashion for each shot. As productions became more complex, it becomes prohibitively expensive to configure on a custom basis all assets that would be referenced in a render in advance. Accordingly, versioning and publishing systems and methods were developed.

Figure 1:
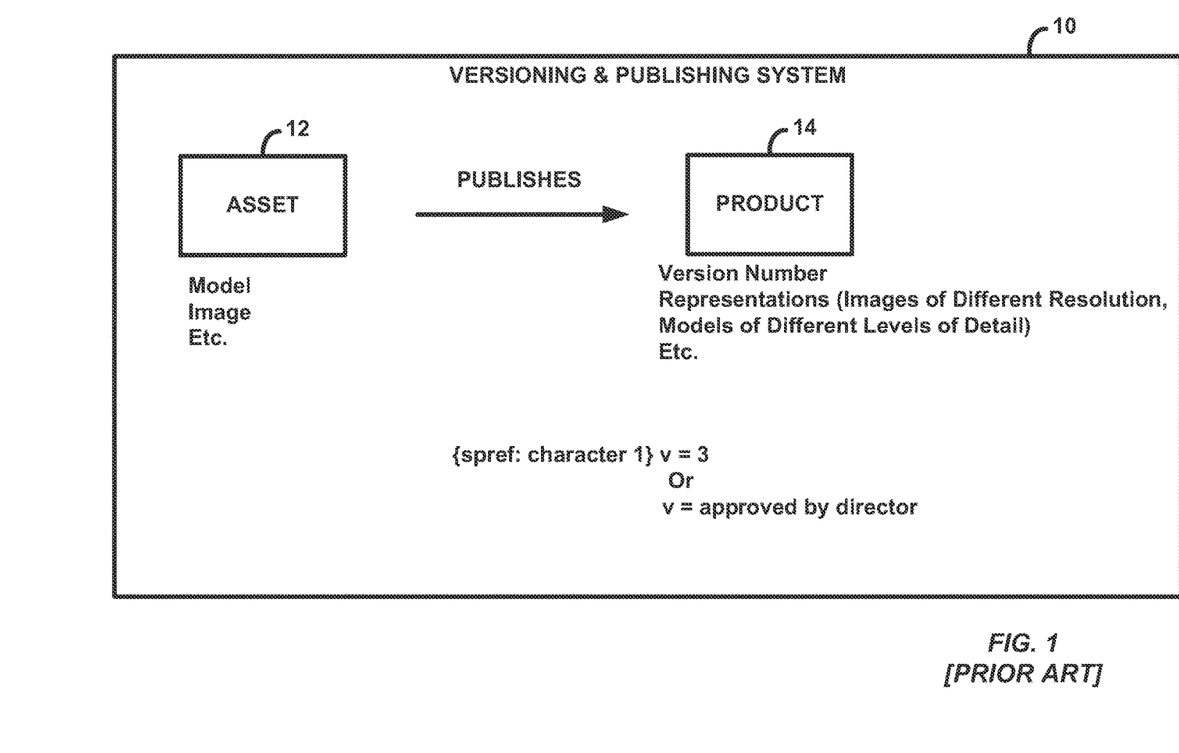
FIG. 1 illustrates a prior art system employed for versioning and publishing, e.g., for keeping track of versions of assets.

FIG. 1 illustrates a prior art versioning and publishing system 10. The system 10 is of a type similar to that described in U.S. Pat. No. 6,947,958, entitled "SYSTEM AND METHOD FOR DOCUMENTING COMPOSITE DATA PRODUCTS", filed Sep. 19, 2001, and issued Sep. 20, 2005, owned by the assignee of the present application and incorporated by reference herein in its entirety. Such systems and methods keep track of assets in a rendered scene, e.g., images, models, or the like. They document the contents of each of a number of composite media products in order to be able to determine the version of each media product or asset used to create the composite media product.

An API may be associated with the versioning and publishing system, allowing an artist to request a particular version or representation of an asset. For example, in one implementation, an artist may construct a SPREF which can refer to a particular version of an asset; the same is used in lieu of a path and filename. Version indicators or tags may indicate a particular version number or may provide an indicator such as "current", "approved", "published", or the like. In FIG. 1, an exemplary SPREF is illustrated for "character 1", and various versions shown, e.g., version 3 and a version "approved by director". The SPREF may then get resolved and a desired asset obtained. If the desired asset is updated to a new version, the SPREF may get linked to the new version. The SPREF itself will stay the same, but will point to the updated file. Versioning and publishing systems such as these allow a convenient way for assets to be catalogued and passed back and forth between artists.

While the ability to know the version of each media product or asset used to create a composite media product is highly useful, such does not allow the automatic retrieval of assets used in a prior shot. For example, it is common that a director may prefer the look of a prior shot over the look of a current shot. However, if assets have evolved in their appearance, e.g., been modified, since the time of the prior shot, there is no convenient way to go back to the prior shot.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to principles described here, also termed VP-VCR systems and methods, respectively, allow query of a database to obtain data for backup and retrieval, e.g., information about shots made at prior points in time, where a "shot" refers to a scene or associated set of sequential frames (a single image may also be considered a shot in some instances), rendered or not depending on context. In the VP-VCR systems and methods, information may be obtained about rendered scenes which allow knowledge and subsequent use of each asset employed in the scene, including its proper version and representation at the time of the rendering. Such may be employed not only to obtain prior versions of shots, but also to allow modification of assets in prior shots to obtain new effects. The systems and methods according to present principles may also be employed to, e.g., following approval of a 2-D image, create a complementary stereo image for 3-D viewing. A difference mode may be employed to conveniently visualize differences between versions of shots.

Systems and methods according to present principles collect input data, dependencies, and process attributes from an executing process without the need for special instrumentation. The data collected may be employed to backup and restore data as well as to lock data employed to faithfully render elements for feature animation and visual effects productions. The same may also be employed to faithfully render a missing stereo element for the same purposes.

Systems and methods according to present principles may provide processes that run at the system level and may collect all opened file and versioning and publishing lookups as well as any attributes that call an API associated with the VP-VCR system during processing. Custom processes may be run after the VP-VCR method is executed to finalize and inject data that is not directly controlled by the versioning and publishing system during the executed VP-VCR process.

In one aspect, the invention is directed towards a method of creating a composite product, the composite product including a plurality of assets, at least one of the plurality having associated version information therewith, including: receiving an indication of a model file indicating a desired composite product, the model file indicating one or more assets and respective version indicators constituting the composite product; and creating the composite product using the one or more assets, the one or more assets chosen from among a plurality at least according to the respective version indicators.

Implementations of the invention may include one or more of the following. The indication may be received from a GUI including a viewer, the indication associated with a rendered file played back on the GUI. The indication may be associated with a rendering session for the rendered file, where the session may be associated with a path for the rendered file. The method may further include restoring the model file from a queue archive. The composite product or asset may be indicated by a SPREF. The version indicator may be a number or may be associated with a "published", "latest", "current", or "approved" reference indicator. The method may further include creating the composite product using a free entry file, where the free entry file is not associated with a version indicator. The method may further include using the model file to populate a product lock table. The method may further include, after the receiving and before the creating, a step of modifying the product lock table. The modifying may include creating a view for a stereo image.

In another aspect, the invention is directed towards a non-transitory computer-readable medium, including instructions for causing a computing environment to perform the above method.

In yet another aspect, the invention is directed towards a method of storing data about a composite product, the composite product including a plurality of assets, at least one of the plurality having associated version information therewith, including, upon receipt of a command to render CG assets constructed in a model file within an application, storing in a database a record of each asset called by the model file, including a version indicator of at least one asset called by the model file.

Implementations of the invention may include one or more of the following. The method may further include storing a path of a render file in a database. The method may further include saving the model file associated with the CG assets constructed within the application in a queue archive database. The method may further include storing a path of each asset called by the model file. The method may further include saving a record of a version of the application. The version indicator may be a number or may be associated with a "published", "latest", "current", or "approved" indicator. The method may further include storing data in the database about free entry files referenced by the file. The method may further include locking each asset referenced by the model file against modification. The method may further include populating a product lock table with data about each asset called by the file, including a version indicator of each product if available.

In another aspect, the invention is directed towards a non-transitory computer-readable medium, including instructions for causing a computing environment to perform the above method.

In yet another aspect, the invention is directed towards a module implemented on a non-transitory computer-readable medium for storing data about a composite product, the composite product including a plurality of assets, at least one of the plurality having associated version information therewith, including: a pre-processing module, the pre-processing module for, for CG assets constructed in an application, upon receipt of a render command, saving a model file associated with the CG assets constructed within the application; a locking module to lock each asset called by the file against modification; and a recording module, the recording module storing in a database a record of each asset called by the file, including a version number or a file path of each asset called by the model file.

Advantages of certain implementations of the invention may include one or more of the following. Certain implementations of the systems and methods may provide convenient ways to re-create past or prior shots, as well as to modify the same to create new images. The disclosed systems and methods may also provide a way to catalog assets used in a render, including their version information, and thus what assets are required to be brought online to re-perform a render. Systems and methods may also provide ways to know, for a given asset, which renders used the same. Systems and methods may allow convenient creation of a complementary stereo image for 3-D viewing, as well as convenient visualization of differences between versions of shots. Other advantages will be apparent to one of ordinary skill in the art, given the description below, including the figures and claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Like reference numerals refer to like elements throughout. Elements are not to scale unless otherwise noted.

DETAILED DESCRIPTION

Figure 2:
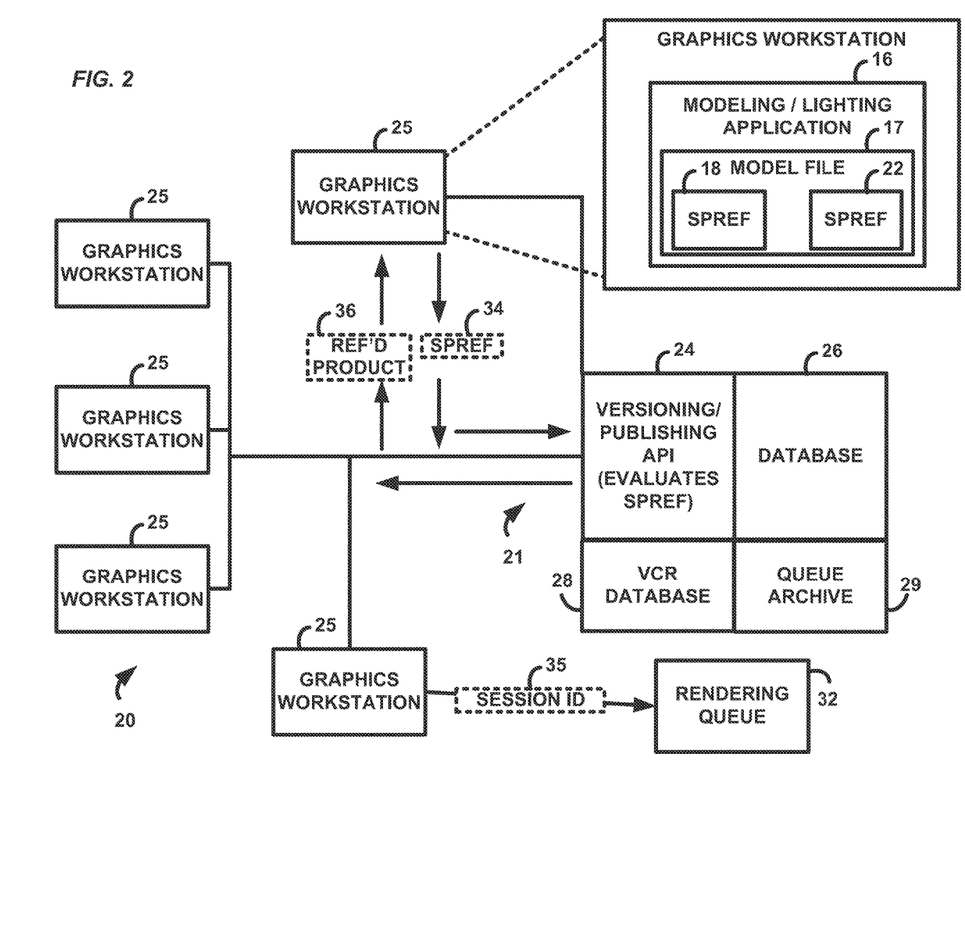
FIG. 2 illustrates a schematic layout of a number of graphics workstations interacting through an API with a versioning and publishing system and its associated databases. The databases may be distributed as shown or may form different portions of a common database.

Referring to the system 20 of FIG. 2, a number of graphics workstations 25 are illustrated accessing a VP-VCR system 21 through a versioning and publishing API 24. The versioning and publishing API 24 and resolves SPREFs delivered to it from the graphics workstations 25 and evaluates the same to return a path of a product or asset to the graphics workstation 25. In particular, a SPREF 34, in the form of a string that references a product or asset, is presented by the graphics workstation 25 to the versioning and publishing API 24 which resolves the SPREF and in particular determines what asset the SPREF is pointing to, and retrieves the same from a database 26. The SPREF may have one or more tags that indicate a number of different versions or representations, including by version number, "highest", "current", "approved", "published", and many more. If one indicator does not exist, e.g. "current", then the versioning and publishing API 24 will check the successive indicator, stopping when the first existing indicator is found. In any case, following resolution, a path 36 to a referenced product or asset is provided back to the graphics workstation 25.

The graphics workstation 25 runs a modeling/lighting application 16 and at a given point in time may be employed by a user to operate on a model file 17 in which various SPREFs 18 and 22 are referenced. A typical modeling/lighting application 16 may include Katana®, a node-based lighting system, available from The Foundry in London, UK, and Los Angeles, Calif. Other types of applications may also benefit from the systems and methods according to present principles, including, e.g., Nuke® compositing products, also available from The Foundry. Generally any application which uses composite products may benefit from the systems and methods disclosed here.

Once a model file 17 is at a point where a render is desired, a command to render the model file 17 performs a rendering, using the models and objects in the file, as well as the selected lighting and cameras. In many large-scale motion picture productions, a command to render the model file 17 sends the model file 17 with the referenced SPREFs to a rendering queue 32, and the rendering may subsequently be performed in a rendering farm, with, e.g., each processor rendering a different frame of the desired scene. The command to render may also lock down product or asset lookups as of that time, e.g., at a VNP_APPLICATION_TIME, so that assets which may be modified during the rendering are only included as they were at the time of the rendering command, and not as later modified.

When a command to render is issued by the graphics workstation 25, a unique session ID 35 is created and assigned to the render, and a reference of the session ID and the source file is saved in a queue archive 29. The session ID 35 is a token that is employed at least in part to recombine the rendered frames post-rendering. The session ID 35 may include information about the time the rendering was begun, and users may add arbitrary metadata to the session ID. To avoid situations where users write over model files, a copy of the model file 17 itself may also be saved in the queue archive 29.

During a render, a number of calls are made to a versioning and publishing API 24. The VCR database 28, which may be, e.g., an Oracle® or an Apache Cassandra® database, records these API calls, including information about what product or asset was evaluated, what version it resolved to, and what file it pointed to. Lookups using the versioning and publishing system are registered directly with the VP-VCR, and the same may be SPREFs or other representations.

For clarity, the database 26 of assets has been shown as a separate database from the queue archive 29 and the VCR database 28. Generally, however, the three databases may be merged or may be spread over a number of different databases, according to the requirements of the system.

Besides calls to the versioning and publishing API 24, the system and method may also record any files opened by the application or applications used by the render process during the render. A shim library layer (or equivalent) may be employed to intercept calls to the operating system to open files, or alternatively a patch may be employed at the operating system level to perform this function. Many of these recorded files may be duplicative of those referenced by calls to the API 24, but may nevertheless provide useful information regarding which files were employed in the render. In recording these files, any time a file is read, the VP-VCR may journal or collect the path that was opened for reading. Such files that were opened but not referenced through the versioning and publishing API 24 are referred to as "free entry" files or just "free entries". Free entries are generally file paths that were referred to during the render, as opposed to versioning and publishing entries which are product or asset lookups.

Generally the result of this monitoring of file openings at the operating system level is a list of file paths, referencing files accessed through the versioning and publishing API 24 as well as free entries. These processes generally collect everything that was used during the render. It is noted that the versioning and publishing API 24 may include information that a directory was accessed, but without details as to the files within the directory. The file path information from the shim library layer intercept system or the like allows the retrieval of this more specific information. The information collected may be added to the information gained from the versioning and publishing lookup and the combination may be stored together.

The information gained may itself provide useful information for debugging. For example, if the versioning and publishing API 24 makes a lookup but the file was never actually opened, this may indicate an error. In the same way, a user familiar with the latest version of a product or asset may quickly review the contents of the stored file in the VCR database 28 to determine if the latest version was in fact used; if not, an error may be inferred.

Figure 3:
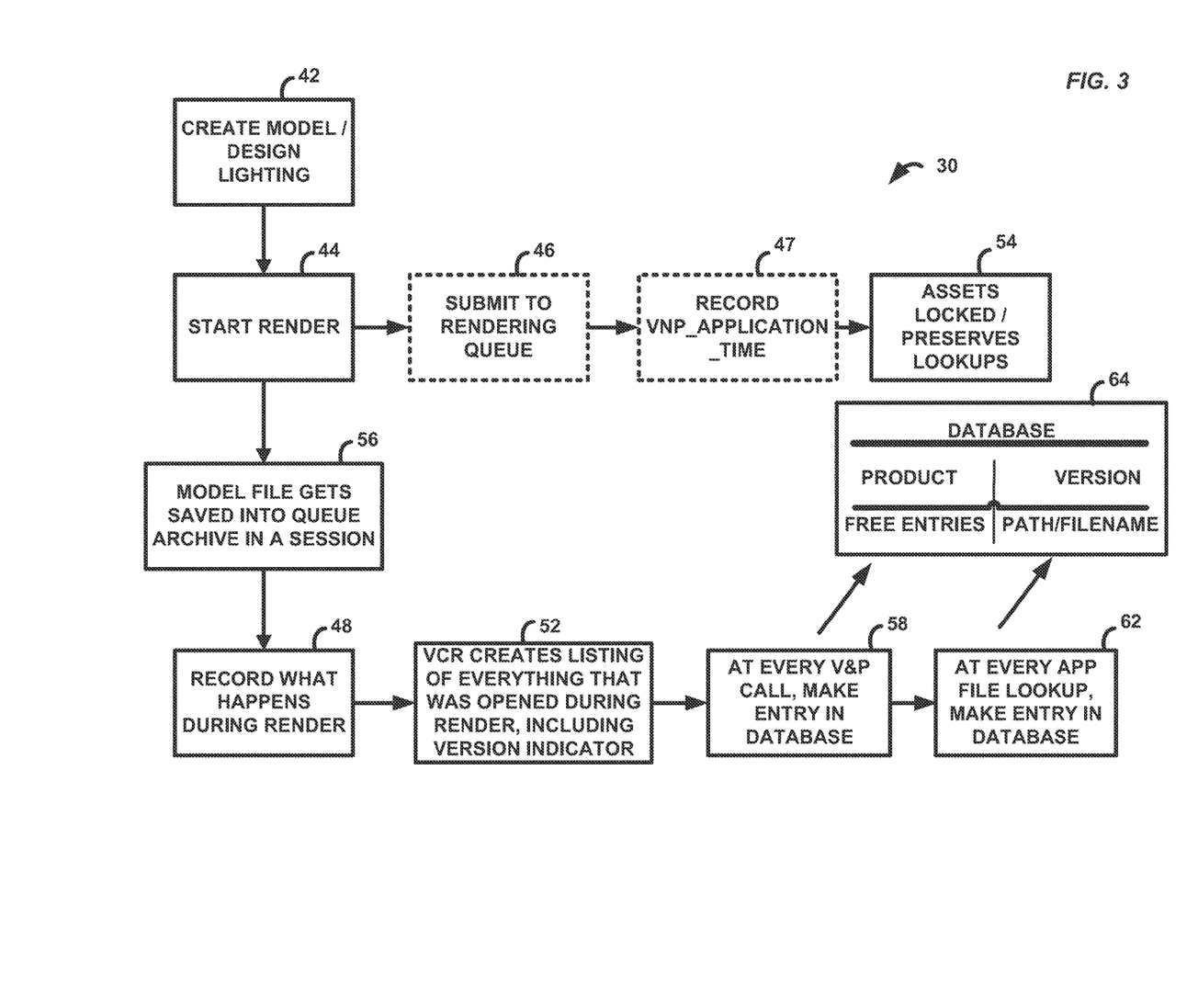
FIG. 3 is a flowchart of a VP-VCR method according to principles disclosed here, for recording assets and their associated versions, as well as free entries, during a rendering process.

FIG. 3 is a flowchart 30 illustrating a method according to present principles. In a first step, a model is constructed and aspects such as lighting and camera positions are designed (step 42). Such construction may be performed using the applications noted above, including node-based lighting systems, compositing applications, and the like.

A command to render the model file may then be received, and the render started (step 44). In some cases a rendering is performed at the local workstation, and in other cases the render is sent to a rendering queue (step 46). In some cases, a time is noted as to when the render began, e.g., termed VNP_APPLICATION_TIME (step 47). The VNP_APPLICATION_TIME may be useful in some contexts where it is known at what time a desired image was created. In many cases, however, a director may view a series of prior shots and simply determine on an artistic basis which is preferable.

During the render, the various assets may be locked (step 54), i.e., so that modifications to the assets, made subsequent to the VNP_APPLICATION_TIME, are not recorded by the VP-VCR, and so that subsequent modifications to the assets are not included in the rendered image. The model file may be saved into the queue archive (step 56), so that the same is safe from inadvertent overwrites by users. The model file may then be restored by the modeling application later if it is desired to obtain a prior version of a rendering.

The system may then record what happens during the render (step 48). In so doing, the VP-VCR creates a listing of everything that was opened by the render application during the render (step 52), including an indication of the version of the assets opened. As noted above, the listing (which may be within a file 64 in a database) may include entries from calls to versioning and publishing API 24 (step 58) as well as files opened by the application or applications used by the render process during the render (step 62). Attributes may also be stored in the file 64, and the attributes may include arbitrary output variables (AOVs), i.e., user-defined variables containing data calculated by the system, or other data such as frame range, command used to start the job, camera used, or other such data in the nature of metadata. Generally any data may be stored that may be helpful to re-create the rendering job.

Figure 4:
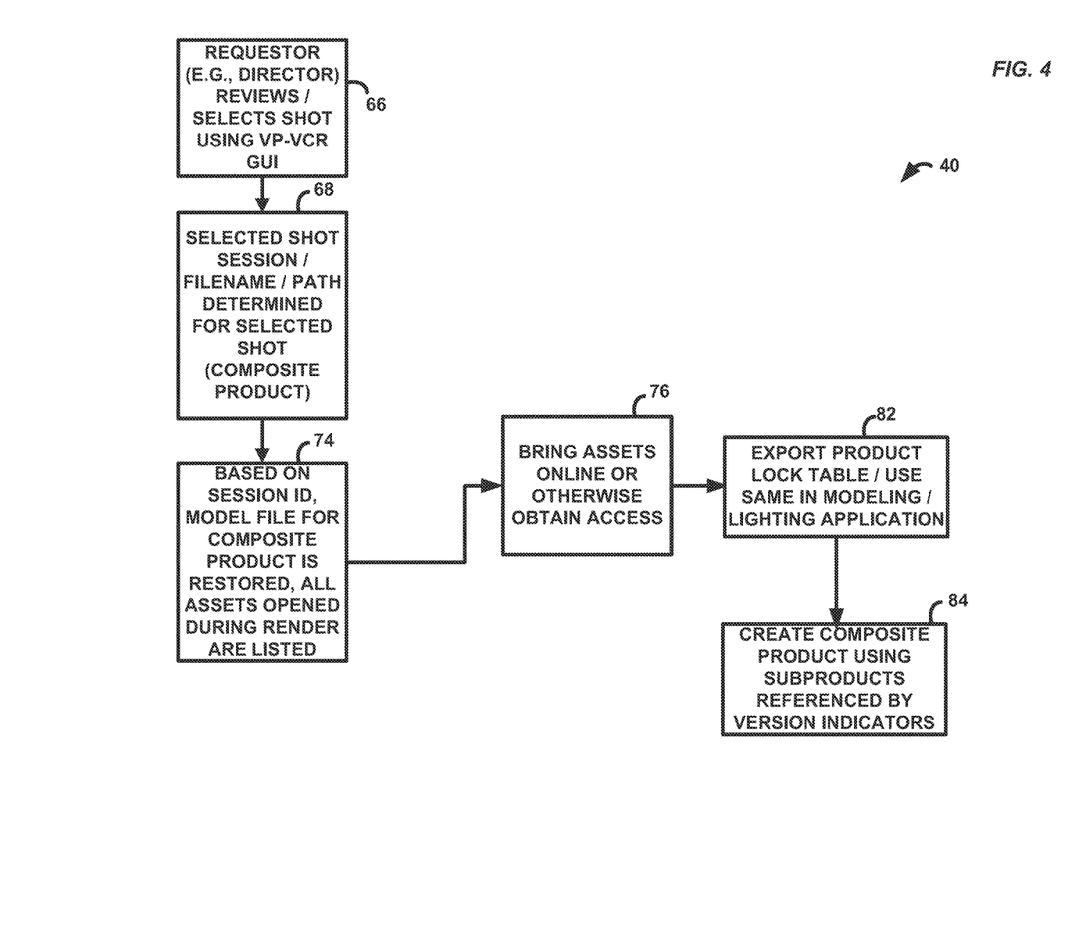
FIG. 4 is a flowchart of a VP-VCR method according to principles disclosed here, for restoring a prior rendering session, including restoring assets employed according to their respective versions at the time of a prior render.

FIG. 4 is a flowchart 40 illustrating steps of a method for restoring a prior shot. In a first step, a requester, e.g., a director, reviews and selects a shot using, e.g., a GUI associated with the VP-VCR (step 66). Such a GUI may provide information about the views imaged from metadata stored therein, e.g., including time of rendering, products or assets included (including thumbnails), and the like. Once a requester finds a desired shot, the same may be selected.

Each rendered shot may have one or more associated session IDs, and the same may then be looked up, along with a filename and path for the model file associated with the session ID (step 68). The GUI may indicate, e.g., a file in a database containing entries that happened during the render, including a notation of all of the prior versions of products or assets used.

It will be understood that numerous variations may be seen in the steps. For example, a select shot may be identified by a filename and path exclusively, with no session ID recorded. A GUI specific to the VP-VCR is not required either, as shots may be viewed using a number of types of viewers. Other variations will also be seen.

Once information about the prior shot is obtained, the model file for the shot, i.e., a composite product with various subproducts or assets, may be restored (step 74). In one specific implementation, a model file may be restored from a queue archive using a command such as "—restore queue_archive" in the modeling/lighting application, e.g., Katana®, Nuke®, or the like. Attributes stored in the queue archive may include the version of the modeling/lighting application used during the render, and thus the restoration may include opening the modeling/lighting application to the correct version.

Following the restoration, the requester may be presented with a list of assets opened during the render. These assets may be brought online or otherwise obtained access to (step 76). The re-rendering may then occur.

In one implementation, the re-rendering occurs by exporting a "product lock table" and using the same in the modeling/lighting application (step 82). Such a product lock table provides a list of referenced assets for an associated render. The product lock table allows essentially an override of products or assets that would otherwise be referenced (e.g., the latest version of all products or the version at the VNP_APPLICATION_TIME), with the desired set of products or assets, i.e., prior assets using versions recorded by the VP-VCR. Where a SPREF would be referenced that would require resolution prior to retrieving an object from a server, products listed in the product lock table do not require such resolution because the user already knows the versions of the products they desire, as the file 64 includes such. Essentially the containers of information used to create the shot will remain the same, but the contents of the containers will be changed to reflect the desired past images. In other words, whenever one of the SPREFs is called, the desired prior version will be called rather than the latest or current version (or any other version). It is also noted that, following importation into the modeling/lighting application, the lock table can be modified if desired. The lock table can be used interactively.

The desired render, i.e., composite product, may then be created using the subproducts or assets referenced in the product lock table, including their version indicators (step 84).

The above system and method allow the correct re-creation of prior scenes. However, systems and methods according to present principles may also be employed to create modified shots based on prior rendering. For example, and referring to the flowchart 50 of FIG. 5, a first step may be to import a product lock table into a modeling/lighting application (step 86). The product lock table may then be modified (step 88). In other words, the product lock table is no longer "all or nothing". Certain objects may be locked but others may be modified. For example, the same scene from a prior rendering may be rendered but with a different color texture on a selected object. Or an object may be changed to another object, e.g., for purposes of creating a different backdrop with a different building.

Figure 5:
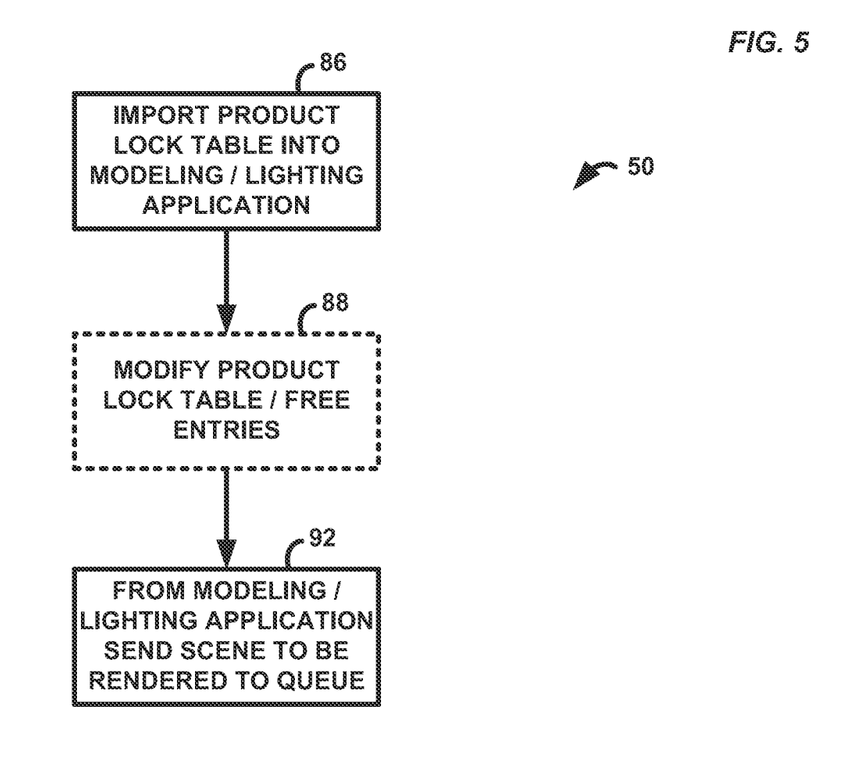
FIG. 5 is a flowchart of a VP-VCR method according to principles disclosed here, for restoring a prior rendering session, including modifying assets employed in a rendering process.

The files that the free entries point to may also be modified but doing so may be more complicated since the same do not appear in the product lock table. For example, a path of a particular free entry may be modified to point to a different file. Of course, to faithfully recreate a desired scene, neither the free entry nor the file it points to should be modified. In any case, once the product lock table and any free entries are in the final state, the model file may be rendered (step 92), e.g., by sending the file to a rendering queue or performing local rendering.

Numerous benefits inure to being able to modify the product lock table, including that prior renderings may be used as the basis for later ones, where the later ones include versions of products that did not exist at the time of the prior rendering.

Figure 6:
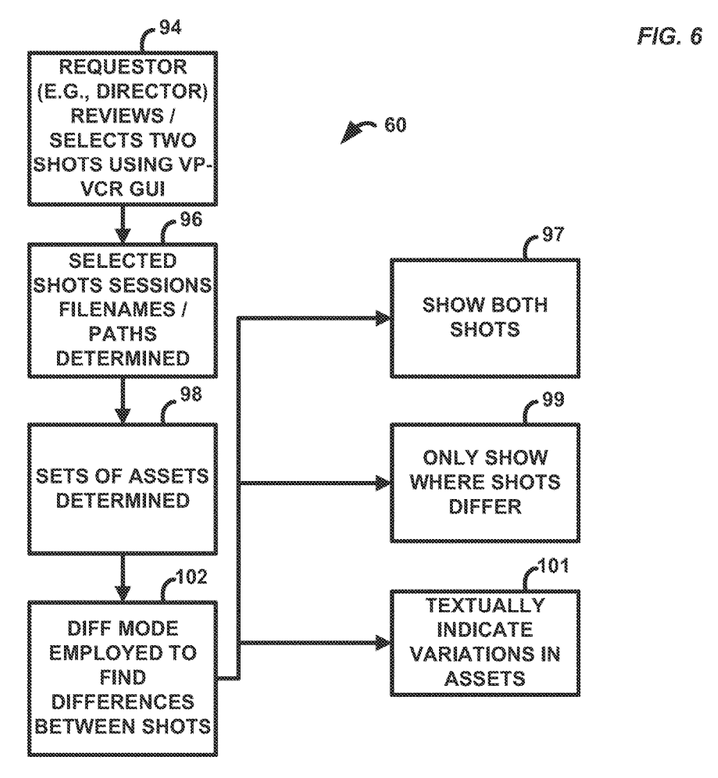
FIG. 6 is a flowchart of a VP-VCR method according to principles disclosed here, for employing a difference mode to compare two shots rendered using different assets.

FIG. 6 is a flowchart 60 of an alternative implementation according to principles described here. In this implementation, a director or other user may view two shots or images and may further view differences between the shots. In a first step, the requester reviews and/or selects two shots using an interface, e.g., a GUI associated with the VP-VCR (step 94). Sessions and/or file paths are determined for the shots (step 96). Sets of corresponding assets used for the different shots are then determined (step 98). A difference mode may then be employed to find the differences between the shots (step 102).

The difference mode may take a number of different forms. For example, both shots may be portrayed side-by-side (step 97) and a viewer may visually determine differences. In an alternative implementation (step 99), objects for which no differences exist may be portrayed in black, and only objects for which differences exist may be visible in the GUI. An indication may be made of the differences between the objects. In yet another implementation, a difference mode may be employed where two files 64 are illustrated, with the differences between the files indicated textually, e.g., in a "redline" type mode. Other implementations will also be apparent to one of ordinary skill in the art given this disclosure.

It will also be clear to one of ordinary skill in the art that variations in the type of difference mode may lead to variations in the extent to which prior assets need to be brought online. If only textual differences are indicated between assets, it may be enough to know just their path and filename. However, if visualization is to occur of assets or differences between assets, the same generally are required to be brought online and accessed by the renderer, e.g., a local workstation or a render farm.

Figure 7:
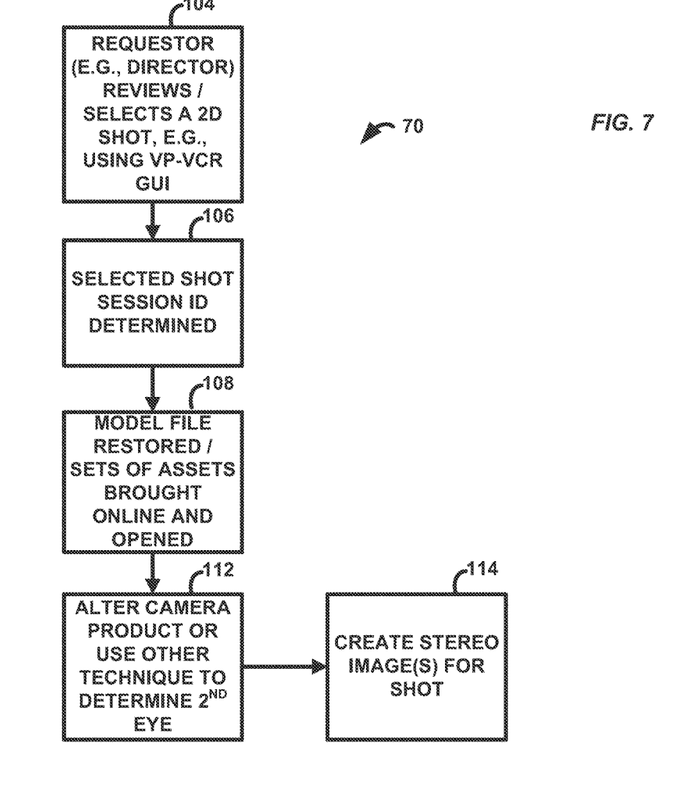
FIG. 7 is a flowchart of a VP-VCR method according to principles disclosed here, for restoring a prior rendering session, including creation of a complementary stereo image to obtain a 3-D view.

FIG. 7 is a flowchart 70 indicating use of systems and methods according to present principles in the creation of a complementary image, e.g., a stereo image corresponding to an initial image, for the purposes of creating a 3-D view. Such implementations may be particularly pertinent where a 2-D image has been finalized in the past, and a studio has decided to create a 3-D version.

In a first step of the flowchart 70, the requester reviews and selects a 2-D shot using, e.g., a GUI associated with the VP-VCR. As before, a session ID is determined (step 106), and a model file is restored, including bringing assets online if needed (step 108). The model file is restored from the queue archive into a modeling/lighting application, compositing application, or other such application which can construct a scene and render the same using referenced assets. In so doing the prior stored values may be employed to seed a product lock table within the application.

A camera product may then be inserted into the constructed scene to create a stereo view (step 112). The camera product is a virtual camera that can construct an alternate view, e.g., one from a viewpoint spaced a few inches away from the initial imaging point, to construct a stereo complementary image. In many cases the additional camera product will be identical in its parameters to the camera product which provided the initial view, and the only difference will be the spacing between their imaging planes. In another implementation an entirely different set of cameras may be employed to realize the new view, with the use of stored VP-VCR data solely to provide an initial seed of the product lock table. Use cases for this include situations where the previously-rendered version is selected but an undesired feature exists in the background. In this case, the new cameras may be employed to visualize views lacking that undesired feature. In any case, the stereo image desired, e.g., that corresponding to the initial view, may then be created (step 114).

Figure 8:
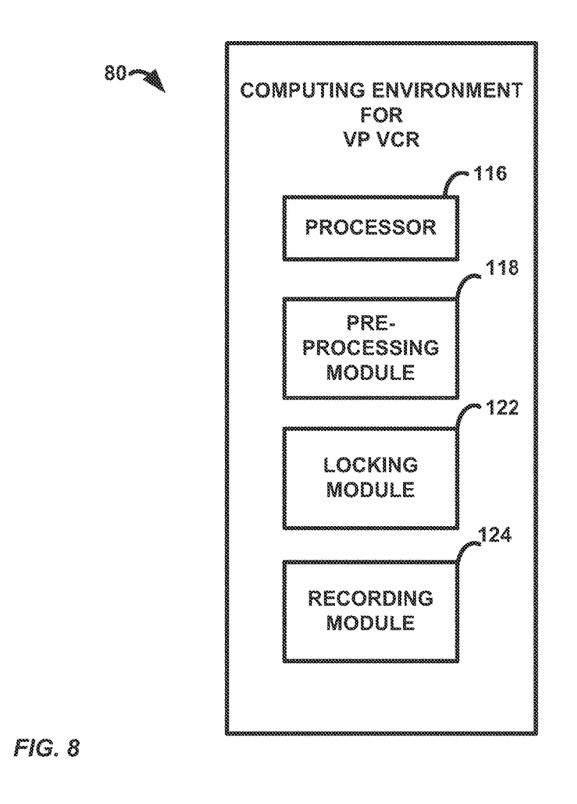
FIG. 8 illustrates an exemplary computing environment in which systems according to principles disclosed here may be embodied and using which methods according to principles disclosed here may be carried out.

FIG. 8 illustrates a computing environment 80 which may be employed to perform steps noted above, or other steps as appropriate to the VP-VCR system. The computing environment 80 includes a processor 116 and various modules. The modules may be contained within a local computing device or may be distributed according to principles of distributed computing.

A pre-processing module 118 may perform various functions, e.g., saving the model file in a queue archive. A locking module 122 may perform functions including, once a render is running, locking assets, modified subsequent to the start of the rendered, from being included in the render. A recording module 124 may perform the majority of the VP-VCR functions, including recording versioning and publishing API calls as well as file openings.

Other modules may also be employed to perform standard functionality for such a computing environment, these other modules not shown in FIG. 8 for simplicity. Such modules include those appropriate for input and output files, running a modeling/lighting application, interacting with the versioning and publishing API, in the like.

What has been described are systems and methods for storing information about assets used in renders and using the information to re-perform renders using prior versions of assets, as well as for performing new renders using modified versions of assets.

One implementation includes one or more programmable processors and corresponding computer system components to store and execute computer instructions, such as to provide the tools for storing information about assets and restoring and modifying sessions to create new rendered shots and scenes. One such computing environment is disclosed below.

Figure 9:
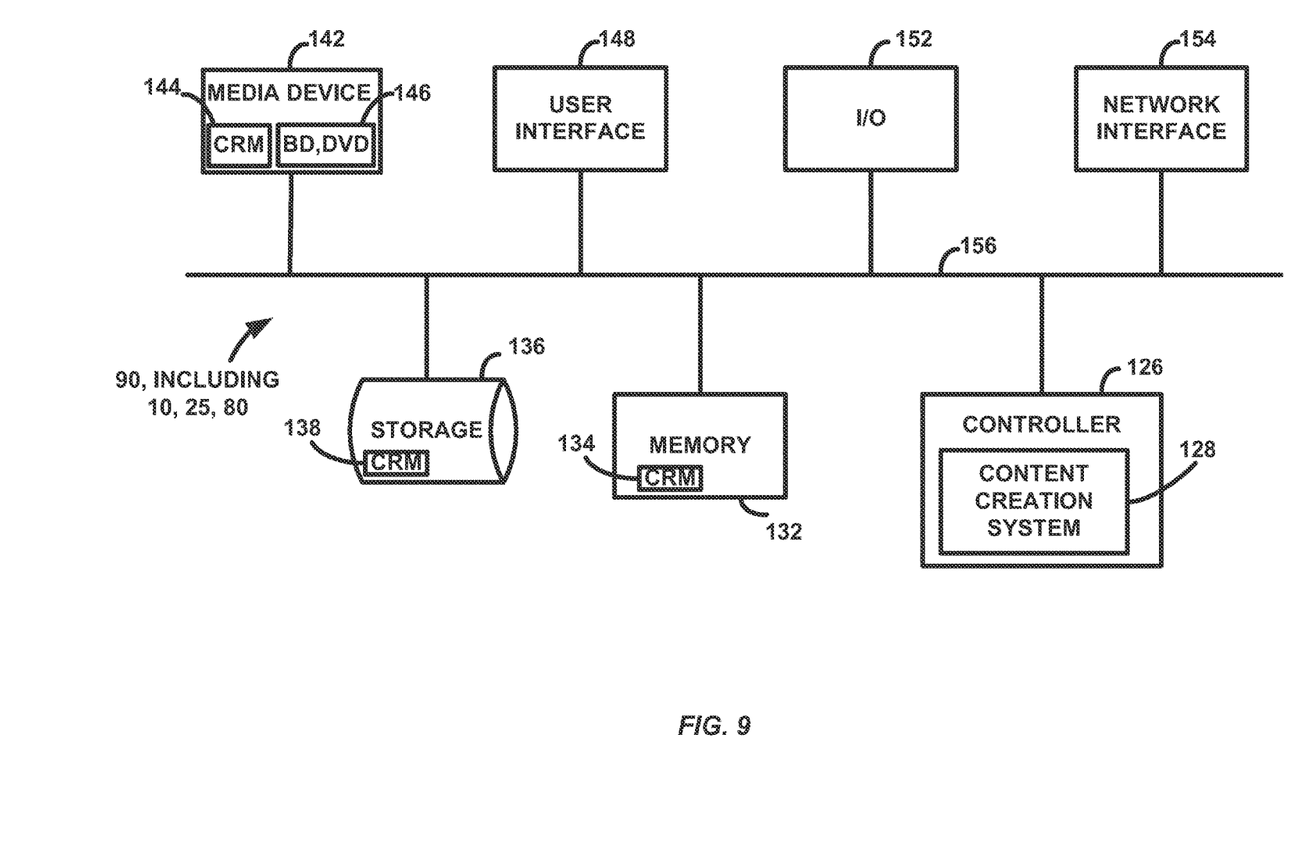
FIG. 9 illustrates another exemplary computing environment in which systems according to principles disclosed here may be embodied and using which methods according to principles disclosed here may be carried out.

Referring to FIG. 9, a representation of an exemplary computing environment 90 for a content creation workstation is illustrated.

The computing environment 90 includes a controller 126, a memory 132, storage 136, a media device 142, a user interface 148, an input/output (I/O) interface 152, and a network interface 154. The components are interconnected by a common bus 156. Alternatively, different connection configurations can be used, such as a star pattern with the controller at the center.

The controller 126 includes a programmable processor and controls the operation of a content creation system 128. The controller 126 loads instructions from the memory 132 or an embedded controller memory (not shown) and executes these instructions to control the system.

Memory 132, which may include non-transitory computer-readable memory 134, stores data temporarily for use by the other components of the system. In one implementation, the memory 132 is implemented as DRAM. In other implementations, the memory 132 also includes long-term or permanent memory, such as flash memory and/or ROM.

Storage 136, which may include non-transitory computer-readable memory 138, stores data temporarily or long-term for use by other components of the system, such as for storing data or instructions. In one implementation, the storage 136 is a hard disc drive or a solid state drive.

The media device 142, which may include non-transitory computer-readable memory 144, receives removable media and reads and/or writes data to the inserted media. In one implementation, the media device 142 is an optical disc drive or disc burner, e.g., a writable Blu-ray® disc drive 146.

The user interface 148 includes components for accepting user input, e.g., the user indication of a desired shot or other aspects discussed above, and presenting a display, e.g., of rendered images, to the user. In one implementation, the user interface 148 includes a keyboard, a mouse, audio speakers, and a display. The controller 126 uses input from the user to adjust the operation of the computing environment.

The I/O interface 152 includes one or more I/O ports to connect to corresponding I/O devices, such as external storage or supplemental devices, e.g., cloud storage devices, a printer or a PDA. In one implementation, the ports of the I/O interface 152 include ports such as: USB ports, PCM-CIA ports, serial ports, and/or parallel ports. In another implementation, the I/O interface 152 includes a wireless interface for wireless communication with external devices. These I/O interfaces may be employed to connect to one or more content playback devices.

The network interface 154 allows connections with the local network and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Exemplary computing environments which may be employed include those pertaining to personal computers, laptop computers, notebook computers, netbook computers, handheld computers, personal digital assistants, mobile phones, smart phones, tablet computers, hand-held gaming devices, gaming consoles, Internet appliances, and also on devices specifically designed for these purposes, in which case the special device would include at least a processor and sufficient resources and networking capability to run the content creation application.

Various illustrative implementations of the present invention have been described. However, one of ordinary skill in the art will recognize that additional implementations are also possible and are within the scope of the present invention. For example, while primarily applications in motion picture production have been described, the disclosed systems and methods can be applied to images from television, video games, single images, and the like. In addition, systems and methods according to present principles may run within a modeling application or may run entirely exterior to such applications.

Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An improved method of storing data about a composite product, the composite product including a plurality of assets, at least one of the plurality having associated version information therewith, comprising:
   receiving a command to render a model file indicating a desired composite product, the composite product being a shot in a video, the model file indicating one or more computer graphics assets and respective version indicators constituting the composite product;
   locking each asset referenced by the model file against modification, so that the one or more computer graphics assets are included in the rendering as they were at a time of the receiving a command to render a model file, and not as later modified;
   rendering the model file and during the rendering, recording calls to a versioning and publishing application programming interface (API), the versioning and publishing application programming interface (API) enabling access to registered assets; and
   during the rendering, monitoring calls to an operating system to record data about at least one file opened by an application associated with the render, the at least one file not referenced by the versioning and publishing application programming interface (API), and storing data together in a file from the recording calls to the versioning and publishing API and from the monitoring calls to an operating system,
   wherein a use of the model file allows retrieval of prior versions of assets, locked in the locking step and referenced by the model file, that have been subsequently modified.

2. The method of claim 1, wherein the command is received from a graphical user interface (GUI) including a viewer, the command associated with a model file viewed on the graphical user interface (GUI).

3. The method of claim 2, wherein the command is associated with a rendering session.

4. The method of claim 3, wherein the session is associated with a path for the rendered file.

5. The method of claim 1, further comprising restoring the model file from a queue archive.

6. The method of claim 1, wherein at least one of the assets indicated by the model file is indicated by a special reference (SPREF).

7. The method of claim 1, wherein the version indicator is a number or is associated with one or more "published", "latest", "current", or "approved" or arbitrary reference indicators.

8. The method of claim 1, wherein the recording data is performed at an operating system level.

9. The method of claim 1, further comprising comparing the recorded calls with the recorded data for debugging.

10. A non-transitory computer-readable medium, comprising instructions for causing a computing environment to perform the method of claim 1.

11. An improved method of restoring a composite product, the composite product including a plurality of assets, at least one of the plurality having associated version information therewith, comprising:
    upon receipt of a command to restore a shot including computer-generated (CG) assets constructed in a model file within an application, restoring the model file;
    displaying a first list of assets associated with the model file, the model file including a list of assets including assets accessed using a versioning and publishing application programming interface (API) stored together with a list of assets accessed not using the versioning and publishing application programming interface (API), the assets on the list accessed not using the versioning and publishing application programming interface (API) determined by monitoring calls to an operating system;
    modifying the displayed list of assets based on user input and displaying a second list of assets, the second list of assets different from the first list of assets, such that a subsequent rendering uses assets in the second list; and
    rendering the composite product based on the model file and the displayed assets,
    wherein a use of the model file allows retrieval of prior versions of assets that have been subsequently modified.

12. The method of claim 11, wherein the displaying includes displaying a product lock table.

13. The method of claim 12, wherein the product lock table includes data about each asset called by the model file, including a version indicator of at least one product, and further comprising resolving the version indicator by finding a first existing version indicator.

14. The method of claim 12, wherein the product lock table includes data about each asset called by the model file, including a version indicator of at least one product.

15. The method of claim 11, further comprising retrieving the model file associated with the assets from a queue archive database.

16. The method of claim 11, further comprising, during the render, storing a path of each asset called by the model file.

17. The method of claim 11, further comprising saving a record of a version of the application.

18. The method of claim 11, further comprising, after the displaying and before the rendering, receiving user input modifying an asset in the displayed list.

19. A non-transitory computer-readable medium, comprising instructions for causing a computing environment to perform the method of claim 11.

* * * * *